United States Patent

Nagashima et al.

Patent Number: 5,858,894
Date of Patent: Jan. 12, 1999

[54] ULTRAVIOLET AND INFRARED RADIATION ABSORBING GLASS

[75] Inventors: Yukihito Nagashima; Isamu Kuroda, both of Osaka, Japan

[73] Assignee: Nippon Sheet Glass Co., Ltd., Osaka, Japan

[21] Appl. No.: 837,946

[22] Filed: Apr. 28, 1997

[30] Foreign Application Priority Data

May 28, 1996 [JP] Japan ................................. 8-133264
Aug. 6, 1996 [JP] Japan ................................. 8-206700

[51] Int. Cl.⁶ .......................... C03C 3/095; C03C 3/087
[52] U.S. Cl. .............................................. 501/64; 501/70
[58] Field of Search ................... 501/64, 65, 66, 501/70

[56] References Cited

U.S. PATENT DOCUMENTS

| | | | |
|---|---|---|---|
| 2,860,059 | 11/1958 | Molter et al. | 501/70 |
| 4,792,536 | 12/1988 | Pecoraro et al. | 501/70 |
| 5,077,133 | 12/1991 | Cheng | 501/64 |
| 5,112,778 | 5/1992 | Cheng et al. | 501/31 |
| 5,240,886 | 8/1993 | Gulotta et al. | 501/70 |
| 5,264,400 | 11/1993 | Nakaguchi et al. | 501/71 |
| 5,318,931 | 6/1994 | Nakaguchi et al. | 501/64 |
| 5,320,986 | 6/1994 | Taniguchi et al. | 501/70 |
| 5,344,798 | 9/1994 | Morimoto et al. | 501/70 |
| 5,362,689 | 11/1994 | Morimoto et al. | 501/70 |
| 5,372,977 | 12/1994 | Mazon-Ramos et al. | 501/57 |
| 5,380,685 | 1/1995 | Morimoto et al. | 501/71 |
| 5,385,872 | 1/1995 | Gulotta et al. | 501/71 |
| 5,565,388 | 10/1996 | Krumwiede et al. | 501/70 |

FOREIGN PATENT DOCUMENTS

| | | |
|---|---|---|
| 0653387 | 5/1995 | European Pat. Off. . |
| 0709344 | 5/1996 | European Pat. Off. . |
| 0745566 | 12/1996 | European Pat. Off. . |
| 0748776 | 12/1996 | European Pat. Off. . |
| 2672587 | 8/1992 | France . |
| 2690437 | 10/1993 | France . |
| 3187946 | 8/1991 | Japan . |
| 4231347 | 8/1992 | Japan . |
| 656466 | 3/1994 | Japan . |
| 6191880 | 7/1994 | Japan . |
| WO91/07356 | 5/1991 | WIPO . |

OTHER PUBLICATIONS

PATENT ABSTRACTS of JAPAN, vol. 095, No. 003, 28 Apr. 1995 for JP 06 345482 A (ASAHI GLASS CO., LTD.), 20 Dec. 1994.

*Primary Examiner*—Karl Group
*Attorney, Agent, or Firm*—Sughrue, Mion, Zinn Macpeak & Seas, PLLC

[57] ABSTRACT

Green-tinted ultraviolet and infrared radiation absorbing glass suitable for use as a windowpane of vehicles, such as automobiles or buildings, is disclosed. The ultraviolet and infrared radiation absorbing glass comprises, in % by weight:

basic glass components comprising
  65 to 80% $SiO_2$,
  0 to 5% $Al_2O_3$,
  0 to 10% MgO,
  5 to 15% CaO,
  10 to 18% of $Na_2O$,
  0 to 5% $K_2O$,
  5 to 15% MgO+CaO,
  10 to 20% $Na_2O+K_2O$, and
  0 to 5% $B_2O_3$; and
coloring components comprising
  0.40 to 0.70% total iron oxide (T—$Fe_2O_3$) in terms of $Fe_2O_3$,
  1.4 to 1.7% of $CeO_2$, and
  0 to 0.5t% of $TiO_2$, wherein 27 to 40 wt% of the T—$Fe_2O_3$ in terms of $Fe_2O_3$ is FeO.

18 Claims, No Drawings

ULTRAVIOLET AND INFRARED RADIATION ABSORBING GLASS

FIELD OF THE INVENTION

The present invention relates to an ultraviolet and infrared radiation absorbing glass having a green tint. More particularly, it relates to an ultraviolet and infrared radiation absorbing glass which is used as a glass for automobiles.

BACKGROUND OF THE INVENTION

In order to meet the demand for protection of interior trim of automobiles against deterioration, which has been increasing with the recent trend to luxury of the interior trim, and to reduce the -load of air conditioning, a glass having ultraviolet and infrared absorbing power has recently been proposed as window glass of automobiles.

For example, conventional green-tinted glass has an ultraviolet transmission reduced to about 38% or less and a total solar energy transmission reduced to about 46% or less while maintaining a visible light transmission of at least 70% for securing the vision through windowpanes of automobiles. There is a recent trend that a bluish green tint is preferred for such a green-tinted glass for automobiles.

It is known that a total solar energy transmission can be reduced by increasing the absolute amount of ferrous oxide (FeO) of the total iron oxides introduced in a glass. Almost all of the conventional infrared radiation absorbing glasses have used this method.

On the other hand, various methods have conventionally been proposed on a method for reducing an ultraviolet transmission. For example, an infrared and ultraviolet radiation absorbing glass disclosed in JP-A-4-193738 (the term "JP-A" as used herein means an "unexamined published Japanese patent application") is characterized by containing cerium oxide and titanium oxide. More specifically, the glass comprises, in % by weight: as basic glass components, 68 to 72% $SiO_2$, 1.6 to 3.0% $Al_2O_3$, 8.5 to 11.0% CaO, 2.0 to 4.2% MgO, 12.0 to 16.0% $Na_2O$ and 0.5 to 3.0% $K_2O$, and as coloring components, 0.65 to 0.75% $Fe_2O_3$, 0.20 to 0.35% of $CeO_2$ and 0.2 to 0.4% of $TiO_2$.

A green-tinted ultravoilet radiation absorbing glass disclosed in JP-A-6-56466 comprises, in % by weight, basic glass components of soda-lime-silica glass and having incorporated therein 0.53 to 0.70% total iron oxide in terms of $Fe_2O_3$, 0.5 to 0.8% $CeO_2$, and 0.2 to 0.4% $TiO_2$ as coloring components, wherein 30 to 40% by weight of the total iron oxide in terms of $Fe_2O_3$ is FeO.

The green-tinted ultraviolet and infrared radiation absorbing glass disclosed in JP-B-6-88812 (the term "JP-B" as used herein means an "examined published Japanese patent application") comprises, in % by weight: as basic glass components, 65 to 75% $SiO_2$, 0 to 3% $Al_2O_3$, 1 to 5% MgO, 5 to 15% CaO, 10 to 15% $Na_2O$, and 0 to 4% $K_2O$, and, as coloring components, 0.65 to 1.25% total iron oxide in terms of $Fe_2O_3$, and 0.2 to 1.4% $CeO_2$, or 0.1 to 1.36% $CeO_2$ and 0.02 to 0.85% $TiO_2$.

Because cerium oxide is expensive, an ultraviolet and infrared radiation absorbing glass having a decreased cerium oxide content has also been proposed. For example, JP-A-4-231347 discloses a green-tinted ultraviolet radiation absorbing glass having a basic glass composition of soda-lime-silica glass and further containing, in % by weight, as coloring components, more than 0.85% total iron oxide (T—$Fe_2O_3$) in terms of $Fe_2O_3$, with an FeO/T—$Fe_2O_3$ ratio being smaller than 0.275, and less than 0.5% $CeO_2$.

The above-described conventional ultraviolet and infrared radiation absorbing glasses have an ultraviolet absorbing power imparted by ultraviolet absorption due to $Fe_2O_3$, $CeO_2$ and $TiO_2$ and interactions among them. Of these components, it is $CeO_2$ that can enhance the ultraviolet absorption power best without giving a yellowish tint unfavorable as a glass for automobiles. However, $CeO_2$ is expensive. Therefore, in order to minimize the amount of $CeO_2$ used, compositions are controlled such that the $CeO_2$ content is decreased and the decreased ultraviolet absorbing power corresponding to such a decreased amount is compensated by using $Fe_2O_3$ and $TiO_2$. However, the light absorbing action of $Fe_2O_3$ or the interaction between $TiO_2$ and FeO is extended over the visible light region. Therefore, if it is tried to increase the ultraviolet absorption of a glass, the transmission of visible light in the short wavelength region is also decreased, so that the glass has a yellowish tint.

SUMMARY OF THE INVENTION

The present invention has been made in the light of the above-described problems associated with the conventional techniques.

Accordingly, an object of the invention is to provide a green-tinted ultraviolet and infrared radiation absorbing glass which has high ultraviolet and infrared absorbing power and is free from yellowness that is unfavorable for use in automobiles.

The ultraviolet and infrared radiation absorbing glass according to the present invention comprises, in % by weight:

basic glass components comprising
  65 to 80% $SiO_2$,
  0 to 5% $Al_2O_3$,
  0 to 10% MgO,
  5 to 15% CaO,
  10 to 18% $Na_2O$,
  0 to 5% $K_2O$,
  5 to 15% MgO+CaO,
  10 to 20% $Na_2O+K_2O$, and
  0 to 5% $B_2O_3$; and coloring components comprising
  0.40 to 0.70% total iron oxide (T—$Fe_2O_3$) in terms of $Fe_2O_3$,
  1.4 to 1.7% $CeO_2$, and
  0 to 0.5% $TiO_2$, wherein 27 to 40% by weight of the T—$Fe_2O_3$ in terms of $Fe_2O_3$ is FeO.

In the above embodiment, when the glass has a thickness of 3.25 to 4.0 mm, the ultraviolet and infrared radiation absorbing glass of the present invention preferably comprises, in % by weight: 0.55 to 0.65% T—$Fe_2O_3$ in terms of $Fe_2O_3$, 1.5 to 1.7% $CeO_2$, and 0 to 0.30% $TiO_2$, wherein 30 to 40% by weight of the T—$Fe_2O_3$ in terms of $Fe_2O_3$ is FeO.

It is still preferable that the $TiO_2$ content in the above glass is 0 to 0.15% by weight.

In another preferred embodiment, the ultraviolet and infrared radiation absorbing glass of the present invention comprises, in % by weight:

basic glass components comprising
  65 to 80% $SiO_2$,
  0 to 5% $Al_2O_3$,
  0 to 10% MgO,
  5 to 15% CaO,
  10 to 18% $Na_2O$, 0 to 5% $K_2O$,
5 to 15% MgO+CaO,
10 to 20% $Na_2O+K_2O$, and
0 to 5% $B_2O_3$; and
coloring components comprising
0.45 to 0.55% total iron oxide (T—$Fe_2O_3$) in terms of $Fe_2O_3$,
1.4 to 1.7% $CeO_2$, and
0 to 0.5% $TiO_2$,
wherein 30 to 40% by weight of the T—$Fe_2O_3$ in terms of $Fe_2O_3$ is FeO.

In the above embodiment, when the glass has a thickness of 4.75 to 6.25 mm, it is preferable that the glass comprises, in % by weight: 1.5 to 1.7% $CeO_2$ and 0 to 0.30% $TiO_2$. It is still preferable that the glass comprises, in % by weight: 0 to 0.15% $TiO_2$ and/or the glass comprises, in % by weight: 0.45 to 0.5% total iron oxide (T—$Fe_2O_3$) in terms of $Fe_2O_3$.

The ultraviolet and infrared radiation absorbing glass of the present invention preferably has a visible light transmission of 65% or more, particularly 70% or more, as measured in a wavelength region of from 380 to 770 nm with the CIE standard illuminant A; a dominant wavelength of 495 to 525 nm and an excitation purity of 1.5 to 3.5% as measured in a wavelength region of from 300 to 770 nm with the CIE standard illuminant C; a total solar energy transmission of less than 50% as measured in a wavelength region of from 300 to 2100 nm; and a total sunlight ultraviolet transmission of less than 36% as measured in a wavelength region of from 300 to 400 nm, when tha glass has a thickness of 5 mm.

DETAILED DESCRIPTION OF THE INVENTION

The reasons for limitations of the glass composition of the ultraviolet and infrared radiation absorbing glass according to the present invention are explained below. Hsereinafter, all percents are by weight.

$SiO_2$ is a main component forming a skeleton of glass. If its content is less than 65%, the glass has poor durability. If it exceeds 80%, it is difficult to melt the composition.

$Al_2O_3$ serves to improve durability of glass. If its content exceeds 5%, it is difficult to melt the composition. A preferred $Al_2O_3$ content is from 0.1 to 2%.

MgO and CaO both serve to improve durability of glass and to control a liquidus temperature and a viscosity of glass composition when forming a glass. If the MgO content exceeds 10%, the liquidus temperature rises. If the CaO content is less than 5% or higher than 15%, the liquidus temperature rises. If the total content of MgO and CaO is less than 5%, durability of the resulting glass deteriorates. If the total content exceeds 15%, the liquidus temperature rises.

$Na_2O$ and $K_2O$ are used as glass melting accelerator. If the $Na_2O$ content is less than 10%, or if the total content of $Na_2O$ and $K_2O$ is less than 10%, the effect of melting acceleration is poor. If $Na_2O$ content exceeds 18%, or if the total content of $Na_2O$ and $K_2O$ exceeds 20%, durability is decreased. It is not preferable that the $K_2O$ exceeds 5% because it is more expensive than $Na_2O$.

While $B_2O_3$ is a component generally used for improvement of durability of glass or as melting aid, it also functions to enhance ultraviolet absorption. If it exceeds 5.0%, exertion of the light transmission reducing effect is extended to the visible region, so that not only the tint tends to be yellowish, but also disadvantages occur in forming due to volatilization of $B_2O_3$ and the like. Accordingly, the upper limit of the $B_2O_3$ content should be 5.0%.

Iron oxide is present in glass in the form of $Fe_2O_3$ and FeO. The former is a component which serves to enhance ultraviolet absorption together with $CeO_2$ and $TiO_2$, while the latter is a component which serves to absorb heat rays.

Where the total iron oxide (T—$Fe_2O_3$) content is within the range of from 0.40 to 0.70%, the FeO/T—$Fe_2O_3$ ratio is preferably in the range of from 0.27 to 0.40 for obtaining desired total solar energy absorption. In the above ratio, the FeO content is expressed in terms of $Fe_2O_3$ content. When the thickness of the glass is from 3.25 to 4.0 mm, the total iron oxide content preferably is from 0.55 to 0.65%, and in this embodiment, the FeO/T-$Fe_2O_3$ ratio is preferably 0.30 to 0.40.

When the thickness of the glass is from 4.75 to 6.25 mm, the total iron oxide content preferably is from 0.45 to 0.55%, and in this embodiment, the FeO/T—$Fe_2O_3$ ratio is also preferably 0.30 to 0.40.

In order to obtain the desired ultraviolet absorption power in the total iron oxide content and the FeO/T—$Fe_2O_3$ ratio falling within the above specified respective ranges, it is necessary that the $CeO_2$ content is from 1.4 to 1.7%. If the $CeO_2$ content is less than 1.4%, the ultraviolet absorbing effect is insufficient. If it exceeds 1.7%, the absorption in the short wavelength side of the visible light region is too large, and the glass becomes yellowish, so that the desired visible light transmission and the desired dominant wavelength cannot be obtained. A preferred $CeO_2$ content is from 1.5 to 1.7%.

$TiO_2$, while not essential, can be added in order to enhance ultraviolet absorption in such a small amount that does not impair the optical characteristics intended in the present invention. The upper limit of the $TiO_2$ content is 0.5%, and preferably 0.3%. If the $TiO_2$ content exceeds the upper limit, the glass tends to be yellow-tinted. In order to make the glass green-tinted, the $TiO_2$ content is preferably 0.15% or less.

If desired and necessary, the glass composition may further contain the following optional components in addition to the above-described components so long as the green tint intended in the present invention is not impaired. That is, the glass may contain other coloring components, e.g., CoO, NiO, MnO, $V_2O_5$, $MoO_3$, etc., and $SnO_2$ as a reducing agent in a total amount of up to 1%. In particular, CoO gives a blue tint and is therefore effective in preventing the glass from being yellow-tinted due to $Fe_2O_3$, $CeO_2$ or $TiO_2$ added in increased amounts. A preferred amount of CoO added is from 3 to 20 ppm.

The ultraviolet and infrared radiation absorbing glass according to the present invention has a green tint and exhibits high ultraviolet absorption, high infrared absorption, and high visible light transmission, especially high ultraviolet absorption.

The present invention will now be described in more detail by reference to the following Examples, but it should be understood that the invention is not construed as being limited thereto. Unless otherwise indicated, all percents, parts, ratios and the like are by weight.

EXAMPLES 1 TO 6

A typical soda-lime-silica glass batch was appropriately compounded with ferric oxide, titanium oxide, cerium oxide, and a carbonaceous material as a reducing agent, and the resulting batch was melted at 1,500° C. for 4 hours in an electric furnace. The molten glass was cast on a stainless steel plate and gradually cooled to room temperature to obtain a glass plate having a thickness of about 10 mm. This glass plate was polished to a thickness of 5 mm to obtain a glass sample for evaluating optical characteristics.

A visible light transmission (YA) measured with the CIE standard illuminant A, a total solar energy transmission (TG), an ultraviolet transmission (Tuv), and a dominant wavelength (Dw) and an excitation purity (Pe) measured with the CIE standard illuminant C were obtained.

Table 1 shown below shows the T—$Fe_2O_3$ concentration, FeO/T—$Fe_2O_3$ ratio, $TiO_2$ concentration, $CeO_2$ concentration, and optical characteristics of the samples.

As is apparent from Table 1, the glass according to the present invention with a thickness of 5 mm has a visible light transmission of 70% or more as measured with the illuminant A, a dominant wavelength of 495 to 525 nm and an excitation purity of 1.5 to 3.5% as measured with the illuminant C, a total solar energy transmission of less than 50%, and an ultraviolet transmission of less than 36%.

COMPARATIVE EXAMPLES 1 AND 2

Comparative Examples are shown in Table 1. Comparative Example 1 is an example in which the FeO/T—$Fe_2O_3$ ratio is out of the range of the present invention. Comparative Example 2 shows an example in which the total iron oxide concentration exceeds the range specified in the invention. In either case, the visible light transmission is below 70%. In Comparative Example 1, the excitation purity is very high, indicating an unfavorable tint.

TABLE 2

|  | Example 7 | Example 8 | Example 9 |
|---|---|---|---|
| T-$Fe_2O_3$ | 0.60 | 0.62 | 0.62 |
| FeO/T-$Fe_2O_3$ | 0.30 | 0.33 | 0.33 |
| $TiO_2$ | 0.03 | 0.12 | 0.25 |
| $CeO_2$ | 1.65 | 1.65 | 1.65 |
| Thickness (mm) | 4.0 | 4.0 | 4.0 |
| YA (%) | 74.6 | 73.9 | 72.8 |
| TG (%) | 48.1 | 46.8 | 45.9 |
| Tuv (%) | 32.1 | 29.4 | 27.2 |
| Dw (nm) | 505 | 512 | 520 |
| Pe (%) | 2.5 | 2.3 | 2.1 |

As is apparent from Table 2, the samples according to the present invention with a thickness of 4 mm have a visible light transmission of 70% or more as measured with the illuminant A, a dominant wavelength of 495 to 525 nm and an excitation purity of 1.5 to 3.5% as measured with the illuminant C, a total solar energy transmission of less than 50%, and an ultraviolet transmission of less than 36%.

As described in detail above, the present invention can provide an ultraviolet and infrared radiation absorbing glass having a high visible light transmission and excellent ultraviolet absorbing power even with a relatively large thickness without yellowing the tint.

TABLE 1

|  | Example 1 | Example 2 | Example 3 | Example 4 | Example 5 | Example 6 | Compara. Example 1 | Compara. Example 2 |
|---|---|---|---|---|---|---|---|---|
| T—$Fe_2O_3$ | 0.50 | 0.55 | 0.55 | 0.63 | 0.50 | 0.55 | 0.55 | 0.75 |
| FeO/T—$Fe_2O_3$ | 0.35 | 0.30 | 0.30 | 0.33 | 0.35 | 0.30 | 0.45 | 0.31 |
| $TiO_2$ | 0.03 | 0.10 | 0.13 | 0.25 | 0.10 | 0.25 | 0.13 | 0.13 |
| $CeO_2$ | 1.40 | 1.50 | 1.50 | 1.70 | 1.60 | 1.50 | 1.50 | 1.70 |
| Thickness (mm) | 5.0 | 5.0 | 5.0 | 5.0 | 5.0 | 5.0 | 5.0 | 5.0 |
| YA (%) | 74.5 | 75.2 | 74.9 | 71.7 | 73.4 | 73.6 | 69.0 | 68.1 |
| TG (%) | 47.5 | 48.3 | 48.1 | 43.1 | 46.6 | 47.0 | 39.8 | 39.4 |
| Tuv (%) | 34.1 | 31.3 | 29.7 | 23.8 | 29.8 | 27.2 | 31.1 | 21.5 |
| Dw (nm) | 497 | 501 | 505 | 518 | 508 | 515 | 495 | 520 |
| Pe (%) | 2.9 | 2.1 | 1.9 | 2.6 | 2.2 | 1.7 | 5.6 | 3.0 |

EXAMPLES 7 TO 9

A typical soda-lime-silica glass batch was appropriately compounded with ferric oxide, titanium oxide, cerium oxide, and a carbonaceous material as a reducing agent, and the resulting batch was melted at 1,500° C. for 4 hours in an electric furnace. The molten glass was cast on a stainless steel plate and gradually cooled to room temperature to obtain a glass plate having a thickness of about 10 mm. The glass plate was polished to a thickness of 4 mm to obtain a glass sample for evaluating optical characteristics.

A visible light transmission (YA) measured with the CIE standard illuminant A, a total solar energy transmission (TG), a UV transmission (Tuv), and a dominant wavelength (Dw) and an excitation purity (Pe) measured with the CIE standard illuminant C were obtained.

Table 2 shown below shows the T-$Fe_2O_3$ concentration, FeO/T-$Fe_2O_3$ ratio, $TiO_2$ concentration, $CeO_2$ concentration, and optical characteristics of the samples.

Further, since the ultraviolet and infrred radiation absorbing glass of the present invention possesses a bluish green tint, it is particularly useful as a windowpane of automobiles.

While the invention has been described in detail and with reference to specific examples thereof, it will be apparent to one skilled in the art that various changes and modifications can be made therein without departing from the spirit and scope thereof.

What is claimed is:

1. Ultraviolet and infrared radiation absorbing glass comprising, in % by weight:
    basic glass components comprising
        65 to 80% $SiO_2$,
        0 to 5% $Al_2O_3$,
        0 to 10% MgO,
        5 to 15% CaO,
        10 to 18% $Na_2O$,
        0 to 5% $K_2O$,
        5 to 15% MgO+CaO,
        10 to 20% $Na_2O+K_2O$, and
        0 to 5% $B_2O_3$, and coloring components comprising
0.40 to 0.70% total iron oxide (T-$Fe_2O_3$) in terms of $Fe_2O_3$,
1.4 to 1.7% $CeO_2$, and
0 to 0.15% $TiO_2$,
wherein 27 to 40% by weight of said T—$Fe_2O_3$ in terms of $Fe_2O_3$ is FeO.

2. The ultraviolet and infrared radiation absorbing glass as claimed in claim 1, wherein said glass comprises, in % by weight:
0.55 to 0.65% T—$Fe_2O_3$ in terms of $Fe_2O_3$, 1.5 to 1.7% $CeO_2$, and
0 to 0.15% $TiO_2$,
wherein 30 to 40% by weight of said T-$Fe_2O_3$ in terms of $Fe_2O_3$ is FeO,
when the thickness of said glass is 3.25 to 4.0 mm.

3. The ultraviolet and infrared radiation absorbing glass as claimed in claim 1, wherein said glass comprises, in % by weight:
basic glass components comprising
65 to 80% $SiO_2$,
0 to 5% $Al_2O_3$,
0 to 10% MgO,
5 to 15% CaO,
10 to 18% $Na_2O$,
0 to 5% $K_2O$,
5 to 15% MgO+CaO,
10 to 20% $Na_2O+K_2O$, and
0 to 5% $B_2O_3$, and
coloring components comprising
0.45 to 0.55% total iron oxide (T—$Fe_2O_3$) in terms of $Fe_2O_3$
1.4 to 1.7% $CeO_2$, and
0 to 0.15% $TiO_2$,
wherein 30 to 40% by weight of said T—$Fe_2O_3$ in terms of $Fe_2O_3$ is FeO.

4. The ultraviolet and infrared radiation absorbing glass as claimed in claim 3, wherein said glass comprises, in % by weight:
1.5 to 1.7% $CeO_2$, and
0 to 0.15% $TiO_2$
when the thickness of said glass is 4.75 to 6.25 mm.

5. The ultraviolet and infrared radiation absorbing glass as claimed in claim 3, wherein said glass comprises, in % by weight, 0.45 to 0.50% total iron oxide (T—$Fe_2O_3$) in terms of $Fe_2O_3$.

6. The ultraviolet and infrared radiation absorbing glass as claimed in claim 1, wherein said glass has a visible light transmission of 65% or more as measured with the CIE standard illuminant A, when said glass has a thickness of 5 mm.

7. The ultraviolet and infrared radiation absorbing glass as claimed in claim 3, wherein said glass has a visible light transmission of 65% or more as measured with the CIE standard illuminant A, when said glass has a thickness of 5 mm.

8. The ultraviolet and infrared radiation absorbing glass as claimed in claim 1, wherein said glass has a visible light transmission of 70% or more as measured with the CIE standard illuminant A, when said glass has a thickness of 5 mm.

9. The ultraviolet and infrared radiation absorbing glass as claimed in claim 3, wherein said glass has a visible light transmission of 70% or more as measured with the CIE standard illuminant A, when said glass has a thickness of 5 mm.

10. The ultraviolet and infrared radiation absorbing glass as claimed in claim 1, wherein said glass has a dominant wavelength of 495 to 525 nm as measured with the CIE standard illuminant C, when said glass has a thickness of 5 mm.

11. The ultraviolet and infrared radiation absorbing glass as claimed in claim 3, wherein said glass has a dominant wavelength of 495 to 525 nm as measured with the CIE standard illuminant C, when said glass has a thickness of 5 mm.

12. The ultraviolet and infrared radiation absorbing glass as claimed in claim 1, wherein said glass has an ultraviolet transmission of less than 36%, when said glass has a thickness of 5 mm.

13. The ultraviolet and infrared radiation absorbing glass as claimed in claim 3, wherein said glass has an ultraviolet transmission of less than 36%, when said glass has a thickness of 5 mm.

14. The ultraviolet and infrared radiation absorbing glass as claimed in claim 1, wherein said glass has a sunlight transmission of less than 50%, when said glass has a thickness of 5 mm.

15. The ultraviolet and infrared radiation absorbing glass as claimed in claim 3, wherein said glass has a sunlight transmission of less than 50%, when said glass has a thickness of 5 mm.

16. The ultraviolet and infrared radiation absorbing glass as claimed in claim 1, wherein said glass has an excitation purity of 1.5 to 3.5% as measured with the CIE standard illuminant C, when said glass has a thickness of 5 mm.

17. The ultraviolet and infrared radiation absorbing glass as claimed in claim 3, wherein said glass has an excitation purity of 1.5 to 3.5% as measured with the CIE standard illuminant C, when said glass has a thickness of 5 mm.

18. The ultraviolet and infrared radiation absorbing glass as claimed in claim 1, wherein said glass comprises, in % by weight, 0 to 0.13% $TiO_2$.

* * * * *